(12) United States Patent
Davydov et al.

(10) Patent No.: US 9,982,526 B2
(45) Date of Patent: May 29, 2018

(54) METHOD AND APPARATUS FOR SPECTRAL NOISE LOGGING

(71) Applicants: Dmitry Aleksandrovich Davydov, Kazan (RU); Artur Mikhailovich Aslanian, Kazan (RU)

(72) Inventors: Dmitry Aleksandrovich Davydov, Kazan (RU); Artur Mikhailovich Aslanian, Kazan (RU)

(73) Assignees: TGT Oil and Gas Services FZE, Sharjah (AE); Sonogram LLC, Kazan (RU)

( * ) Notice: Subject to any disclaimer, the term of this patent is extended or adjusted under 35 U.S.C. 154(b) by 0 days. days.

(21) Appl. No.: 14/007,972

(22) PCT Filed: Dec. 3, 2012

(86) PCT No.: PCT/RU2012/001006
§ 371 (c)(1),
(2) Date: Sep. 27, 2013

(87) PCT Pub. No.: WO2013/162411
PCT Pub. Date: Oct. 31, 2013

(65) Prior Publication Data
US 2015/0204184 A1 Jul. 23, 2015

(30) Foreign Application Priority Data
Apr. 23, 2012 (GB) .................................. 1207076.9

(51) Int. Cl.
*E21B 47/10* (2012.01)
*G01V 1/50* (2006.01)

(52) U.S. Cl.
CPC .............. *E21B 47/101* (2013.01); *G01V 1/50* (2013.01); *G01V 2200/16* (2013.01); *G01V 2210/34* (2013.01); *G01V 2210/38* (2013.01)

(58) Field of Classification Search
CPC ........ G01V 1/44–1/50; G01V 2200/16; G01V 2210/34–2210/38; E21B 47/0005; E21B 47/101
See application file for complete search history.

(56) References Cited

U.S. PATENT DOCUMENTS

| | | | |
|---|---|---|---|
| 2,210,417 A | 8/1940 | Kinley | |
| 2,396,935 A | 3/1946 | Walstrom | |
| 4,046,220 A | 9/1977 | Glenn, Jr. | |
| 4,046,221 A | 9/1977 | Edenfield | |
| 4,114,721 A * | 9/1978 | Glenn, Jr. | E21B 47/101 181/102 |

(Continued)

FOREIGN PATENT DOCUMENTS

| | | |
|---|---|---|
| EP | 1260968 A1 | 11/2002 |
| RU | 2296437 C2 | 7/2007 |
| WO | WO 20091049995 | 1/2009 |

*Primary Examiner* — Orlando Bousono
(74) *Attorney, Agent, or Firm* — Boyle Fredrickson S.C.

(57) ABSTRACT

In the present invention that considerable advantage is to be gained in the provision of apparatus and methods for spectral noise logging that exhibit improved frequency resolution and thus sensitivity over those systems known in the art since this would allow for improved detection and characterization of fluid flow through, or behind, a casing of a well penetrating subsurface formations.

15 Claims, 9 Drawing Sheets

(56) References Cited

U.S. PATENT DOCUMENTS

| | | | | |
|---|---|---|---|---|
| 4,217,659 A | * | 8/1980 | Glenn, Jr. | G01V 1/50 367/30 |
| 4,255,798 A | * | 3/1981 | Havira | E21B 47/0005 181/105 |
| 4,319,346 A | | 3/1982 | MacDonald | |
| 4,353,122 A | | 10/1982 | Cubberly, Jr. | |
| 4,562,556 A | * | 12/1985 | Ingram | G01H 5/00 181/102 |
| 4,646,273 A | | 2/1987 | Carlson et al. | |
| 4,703,459 A | * | 10/1987 | Bower | E21B 43/119 181/104 |
| 4,744,416 A | | 5/1988 | Bower | |
| 4,885,722 A | * | 12/1989 | Leland | G01V 1/364 367/25 |
| 4,928,269 A | * | 5/1990 | Kimball | G01V 1/50 181/105 |
| 5,130,949 A | * | 7/1992 | Kan | E21B 47/06 181/105 |
| 5,233,568 A | * | 8/1993 | Kan | E21B 47/06 367/27 |
| H001307 H | * | 5/1994 | Krohn | G01V 1/42 181/101 |
| 5,331,604 A | * | 7/1994 | Chang | G01V 1/44 367/31 |
| 5,343,440 A | * | 8/1994 | Kan | E21B 47/06 367/27 |
| 6,026,913 A | * | 2/2000 | Mandal | E21B 47/02208 175/45 |
| 6,205,087 B1 | | 3/2001 | Fukuhara et al. | |
| 6,269,198 B1 | * | 7/2001 | Hodgson | G01V 1/52 356/478 |
| 6,288,975 B1 | * | 9/2001 | Frederick | G01H 9/004 181/102 |
| 6,470,275 B1 | * | 10/2002 | Dubinsky | G01V 1/48 702/17 |
| 6,568,486 B1 | * | 5/2003 | George | G01V 1/44 175/45 |
| 6,724,319 B1 | * | 4/2004 | Knaack | G01H 9/004 250/227.14 |
| 6,728,165 B1 | * | 4/2004 | Roscigno | G01H 9/004 181/102 |
| 6,950,749 B2 | * | 9/2005 | Frenkel | G01V 3/28 324/339 |
| 7,219,762 B2 | | 5/2007 | James et al. | |
| 2003/0011490 A1 | * | 1/2003 | Bailey | G01V 11/002 340/853.3 |
| 2005/0036403 A1 | * | 2/2005 | Leggett, III | G01V 1/44 367/32 |
| 2005/0270172 A1 | * | 12/2005 | Bailey | G01V 11/002 340/854.3 |
| 2006/0133203 A1 | | 6/2006 | James et al. | |
| 2008/0019216 A1 | * | 1/2008 | Leggett, III | G01V 1/44 367/25 |
| 2008/0130409 A1 | * | 6/2008 | Leggett, III | G01V 1/44 367/35 |
| 2009/0222209 A1 | * | 9/2009 | Morys | G01V 11/005 702/9 |
| 2010/0118648 A1 | * | 5/2010 | Zhao | G01V 1/44 367/35 |
| 2010/0265796 A1 | * | 10/2010 | Steinsiek | B06B 1/0622 367/35 |
| 2010/0268489 A1 | * | 10/2010 | Lie | E21B 47/101 702/51 |
| 2011/0080805 A1 | * | 4/2011 | Vu | G01V 1/46 367/32 |
| 2012/0013893 A1 | * | 1/2012 | Maida | E21B 47/16 356/73.1 |
| 2012/0057432 A1 | * | 3/2012 | Hill | E21B 43/11857 367/81 |
| 2012/0063267 A1 | * | 3/2012 | Hill | E21B 43/11857 367/82 |
| 2012/0069705 A1 | * | 3/2012 | Zhao | G01V 1/44 367/35 |
| 2012/0111560 A1 | * | 5/2012 | Hill | E21B 43/11857 166/250.1 |

\* cited by examiner

METHOD AND APPARATUS FOR SPECTRAL NOISE LOGGING

The present invention relates to the field of hydrocarbon exploration. More specifically, the present invention concerns well logging and in particular relates to apparatus and methods for spectral noise logging that allow for the detection of fluid flow through, or behind a casing of a well penetrating subsurface formation, including noise generated by fluid filtration within a reservoir.

Acoustic noise logging of wells so as to determine the location of leaks through a casing is well known in the art. For example, in U.S. Pat. No. 2,210,417 leaks through a well casing are located by determining the location of sound produced by liquid passing through openings in the casing. This is achieved by moving a sound detector, which is connected to an up-hole indicating device or recording means, through the well. The intensity of sound produced by the liquids passing through the casing is thus indicative of a leak in the casing, and the location of such leaks is discernible from a graphical record of acoustic noise intensity versus the depth of the sound detector within the well. A similar method of determining the location of fluid flow into a well is disclosed in U.S. Pat. No. 2,396,935.

In U.S. Pat. No. 4,046,220 an up-hole spectrum analyser is introduced to the above describe equipment so as to provide a means for analysing a frequency spectrum of an amplified signal from an acoustic detector. This allows for the identified leak to be characterised. In particular, the frequency spectrums are recorded and compared with predetermined spectrum analysis characteristics so as to distinguish single-phase gas and single-phase liquid leaks.

U.S. Pat. No. 4,114,721 teaches of apparatus and methods for extending the techniques described in U.S. Pat. No. 4,046,220 by monitoring the acoustic noise at two spaced-apart locations within the well. The detected signals are then subsequently time correlated so as to provide a means for assisting in locating the source of the acoustic noise.

U.S. Pat. No. 4,744,416 teaches of employing two sound detectors so as to provide a means for identifying the direction from which the subsurface noise source is coming. Such identification acts to further assist in the location of the casing leak i.e. a fluid flow through the casing.

In U.S. Pat. No. 4,353,122 two sound detectors are also employed so as to provide a differential noise logging tool. By monitoring the differential noise between the sound detectors a means is provided for distinguishing between point noise sources, such as producing perforations, from flowing fluid channel noise behind the casing or for distinguishing said jet entry into a cased well from ordinary fluid or gas entry. All the described methods of noise logging are accordingly achieved by employing a continuous logging process while minimising road noise caused by the bumping and scraping of the tool during this process.

An alternative method and system for acoustic well logging that provides an indication of the characteristics of fluid flow behind subsurface casing or pipe is described in U.S. Pat. No. 4,646,273. The described tool couples the detected acoustic energy into four high pass frequency filters having cut-off frequencies of approximately 200, 600, 1000 and 2000 Hz. The output signals from the filters are relayed via a cable to the surface and are converted into D.C. signal levels indicating the energy levels of the respective signals.

The 200-600 Hz band-pass is compared to the energy level of the 1000 Hz high-pass to provide an indication of the flow characteristics of the fluid through the channel i.e. whether It is a single phase gas or a single phase liquid or a multi-phase combination 1 flow. The coarse frequency resolution and the time averaging employed limit the application of the described methods and apparatus to the detection of leaks exhibiting high flow rates, where the noise generated is semi-continuous and significant compared to background noise. Moreover, employing such methods and apparatus makes it impossible to separate acoustic noise generated by well completion leaks from acoustic noise generated within the surrounding formation.

The concept of analysing the acoustic noise detected by a sound detector located within a borehole within the frequency domain is exploited in U.S. Pat. No. 4,319,346. This document teaches of employing downhole noise detectors so as to relay information via a logging cable to independent surface located spectrum analysers. The spectrum analysers converts the detected amplitude signals to the frequency domain so as to allow signal processing techniques to be performed which remove the effects of signal attenuation within the logging cable and thus allow for variable density acoustic logs to be generated. The frequency resolution employed by the apparatus to generate the variable density logs do not allow for information to be extracted regarding acoustic noise generated within the surrounding formation or for allowing for the identification of leaks or completion elements Analysis of acoustic signals within the frequency domain has also been employed so as to detect the presence of leaks behind a casing. For example, U.S. Pat. No. 7,219,762 teaches of using a noise detector mounted on a cable so as to record the acoustic amplitude at a plurality of predetermined locations along the borehole. The measured acoustic amplitudes are processed using Fourier transform analysis so as to allow for power-frequency spectra of the borehole to be generated. The power-frequency spectra are then analysed so as to detect time and frequency dependant changes of power and thus identify the presence of leaks behind the casing. Although providing a means for detecting leaks exhibiting lower flow rates than those that can be detected by employing the methods and apparatus described above in relation to U.S. Pat. No. 4,646,273, the frequency resolution still remains prohibitive to separating acoustic noise generated by well completion leaks from acoustic noise generated within the surrounding formation or for allowing for the identification of completion elements It is recognised in the present invention that considerable advantage is to be gained in the provision of apparatus and methods for spectral noise logging that exhibit improved frequency resolution and thus sensitivity over those systems known in the art since this would allow for improved detection and characterisation of fluid flow through, or behind, a casing of a well penetrating subsurface formations It is therefore an object of an aspect of the present invention to obviate or at least mitigate the foregoing disadvantages of the apparatus and methods of acoustic noise logging known in the art.

SUMMARY OF INVENTION

According to a first aspect of the present invention there is provided a method of producing a spectral noise log of a borehole the method comprising:

The recording two or more power-frequency spectrum data sets at a two or more stationary position within the borehole;

The detecting an acoustic noise within a first frequency range;

The additionally detecting an acoustic noise within a second frequency range, the second frequency range comprising lower frequencies than the first frequency range.

The processing the two or more power-frequency spectrum data sets recorded at each of the two or more stationary position so as to assign a single power-frequency spectrum to each stationary position.

Preferably the method further comprises recording the depth of the stationary positions within the borehole.

The method of producing the spectral noise log may further comprise stacking the assigned single power-frequency spectrums so as to produce a spectral noise logging panel.

The stationary locations may be regularly spaced within the borehole.

The first frequency range may be in the range of 117 Hz to 60 kHz.

The second frequency range may be in the range of 8 Hz to 4 kHz.

The processing of the two or more power-frequency spectrum data sets recorded at a stationary position may comprise a numerical averaging of the power-frequency spectrum data sets.

The numerical averaging of the power power-frequency spectrum data sets preferably comprises numerical filtering so as to provide a means for verifying the statistical significance of the details in the power-frequency spectrum data.

According to a second aspect of the present invention there is provided a spectral noise logging (SNL) tool the tool comprising:
an acoustic detector;
a first frequency channel located within which is a first gain stage arranged to amplify a first component of an electrical output signal generated by the acoustic detector;
an additionally second frequency channel located within which is a second gain stage arranged to amplify and filter a second component of an electrical output signal generated by the acoustic detector;
an analogue to digital convertor which provides a means for digitising the amplified output from the first gain stage:
a computer processing unit (CPU) that provides a means for signal processing the digitised output from the analogue to digital convertor so as to generate a power-frequency spectrum data set;
and an internal memory that provides a means for saving one or more power-frequency spectrum data sets produced by the signal processing of the CPU.

Most preferably the acoustic detector detects acoustic noise in the range of 8 Hz to 60 kHz.

The acoustic detector may comprise a pressure pulse sensor or hydrophone.

The hydrophone may comprise a piezo electric material mounted within a chamber.

The piezo electric material may comprise a piezoceramic.

The chamber is preferably oil filed. The presence of oil in the chamber assists with coupling the acoustic noise to the piezo electric material.

The analogue to digital convertor preferably samples the first frequency channel at a first sampling rate.

The first sampling rate may be 120 kHz.

The low pass filter preferably frequencies greater than 4 kHz from propagating through the second channel.

The analogue to digital convertor preferably samples the second frequency channel at a second sampling rate, the second sampling rate being lower than the first sampling rate.

The second sampling rate may be 8 kHz.

The saved power-frequency spectrum data set comprises digitised lime data.

The digitised time data comprises 1024 discrete time channels.

The CPU may provide a Fast Fourier Transform (FFT) to the digitised output from the analogue to digital convertor.

In this embodiment the saved power-frequency spectrum data set comprises digitised frequency data.

Most preferably the digitised frequency data comprises 1024 discrete frequency channels.

It is preferable for the SNL tool to further comprise a computer interface that provides a means for downloading the power-frequency spectrum data sets saved on the internal memory.

Embodiments of the fourth aspect of the invention may comprise features to implement the preferred or optional features of the first to third aspects of the invention or vice versa.

BRIEF DESCRIPTION OF DRAWINGS

Aspects and advantages of the present invention will become apparent upon reading the following detailed description and upon reference to the following drawings in which.

Figure 1:
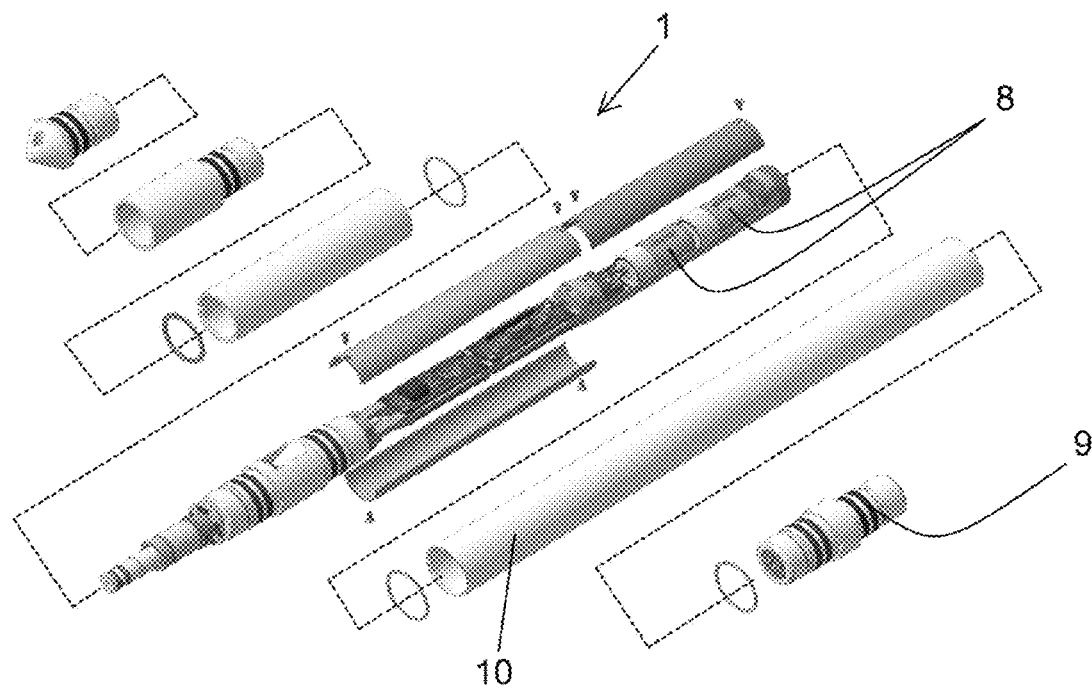
FIG. 1 presents an exploded view of a spectral noise logging tool in accordance with an embodiment of the present invention.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Figure 2A:
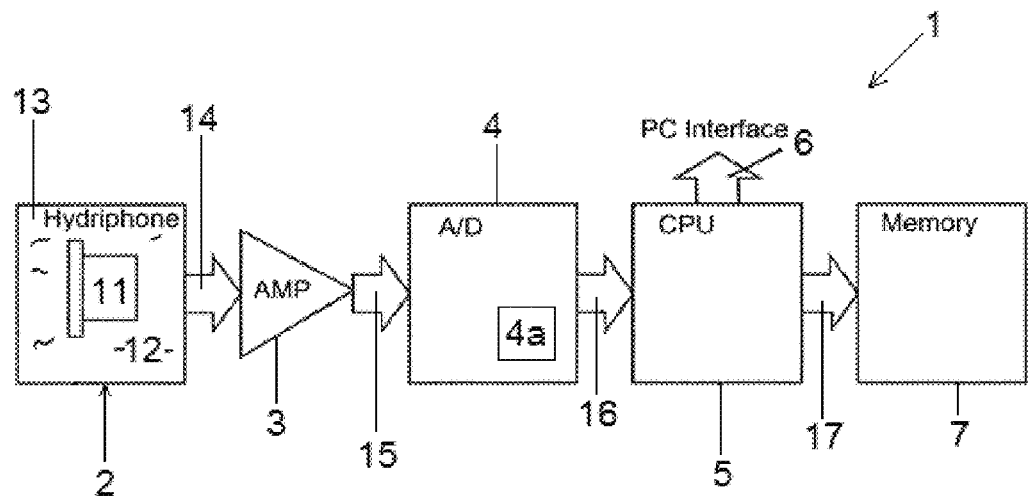
FIG. 2 presents a block diagram of a spectral noise logging tool:
(a) in accordance with a first embodiment of the present invention; and
(b) in accordance with a second embodiment of the present invention.

A spectral noise logging (SNL) tool 1 in accordance with an embodiment of the present invention will now be described with reference to FIG. 1 and FIG. 2. In particular, FIG. 1 presents an exploded view of the SNL tool 1 while FIG. 2(a) presents a block diagram of a first embodiment of the tool 1. The SNL tool 1 can be seen to comprise an acoustic detector 2, a gain stage 3, a single channel analogue to digital convertor 4, a computer processing unit (CPU) 5 having an external computer interface 6 and an internal memory 7. From FIG. 1 the SNL tool 1 can be seen to further comprise an internal power supply 8, in the form of two battery cells, and a connector 9 that provides a means for attaching the SNL tool 1 to a cable and winch mechanism, as described further detail below with reference to FIG. 3. AU of the above components are housed within a tool casing 10 so as to provide physical protection to all of these components.

The acoustic detector 2 in the presently described embodiment comprises a pressure pulse sensor or hydrophone. Such acoustic detectors are known to those skilled in the art and can take a variety of designs. In the presently described embodiment the hydrophone 2 comprises a piezo electric transducer 11 located within a chamber 12 that is filled with an oil 13. The chamber 12 provides physical protection for the piezo electric transducer 11 while the surrounding oil 13 assists with coupling the acoustic noise to the piezo electric transducer 11. The piezo electric transducer 11 in the presently described embodiment has an operating frequency range of 8 Hz to 60,000 Hz.

The gain stage 3 is employed to amplify the electrical output 14 from the hydrophone 2 by a factor of 100,000. As can be seen from FIG. 2(a) the output 15 of the gain stage 3 is then converted into a digital signal 16 by the 12 bit analogue 10 digital convertor 4. In the presently described embodiment this is achieved by sampling 1024 measurement samples at a sampling frequency of 120 kHz which may initially be stored within 1 a cache memory 4a of the digital convertor 4.

Signal processing of the digital signal 16 is then performed within the CPU 5. In particular, the CPU 5 may provide a Fast Fourier Transform (FFT) to the digital signal 16 so as to convert this signal 16 to obtain a power-frequency spectrum data signal 17 from the acoustic noise detected by the hydrophone 2. The power-frequency spectrum data signal 17 is then saved as 1024 discrete frequency channels within the non-volatile, 1 GB capacity, internal memory 7.

In the presently described embodiment the SNL tool 1 effectively measures an 8.53 ms sample length every second. Therefore the internal memory 7 effectively stores data for generating a power-frequency spectrum for every second of operation of the SNL tool 1 the frequency range from 117 Hz to 60 kHz. The employment of the cache memory 4a in conjunction with the internal memory 7 assist in allowing the SNL tool 1 to achieve such high sampling frequencies. Once the tool 1 is retrieved from a borehole through which acoustic noise sampling has been performed the entire power-frequency spectrum data can be downloaded, as appropriate, via the computer interface 6 of the CPU 5.

The presently described SNL tool 1 has an overall diameter of 38 mm, a length of 800 mm and a weight of 5 kg. The maximum operating pressure is 60 MPa, the maximum operating temperature is 120° C. while the dynamic range of the device is 68 dB. The internal power supply 8 provides the tool 1 with an operating lifetime of forty eight hours before this component is required to be recharged or replaced. In practice, it is found that when the internal memory 7 is full the power-frequency spectrum data downloading process takes approximately ten minutes to complete. It will be appreciated by the skilled reader that these operating parameters may be vary between alternative embodiments of the SNL tool.

One such alternative embodiment comprises an SNL tool 1 wherein the CPU 5 is not employed to provide a Fast Fourier Transform (FFT) to the digital signal 16. Instead the power-frequency spectrum data signal 17 is saved as 1024 discrete time channels within the non-volatile internal memory 7. In this embodiment FFT signal processing of this data is performed at the surface following retrieval of the SNL tool 1.

Figure 2B:
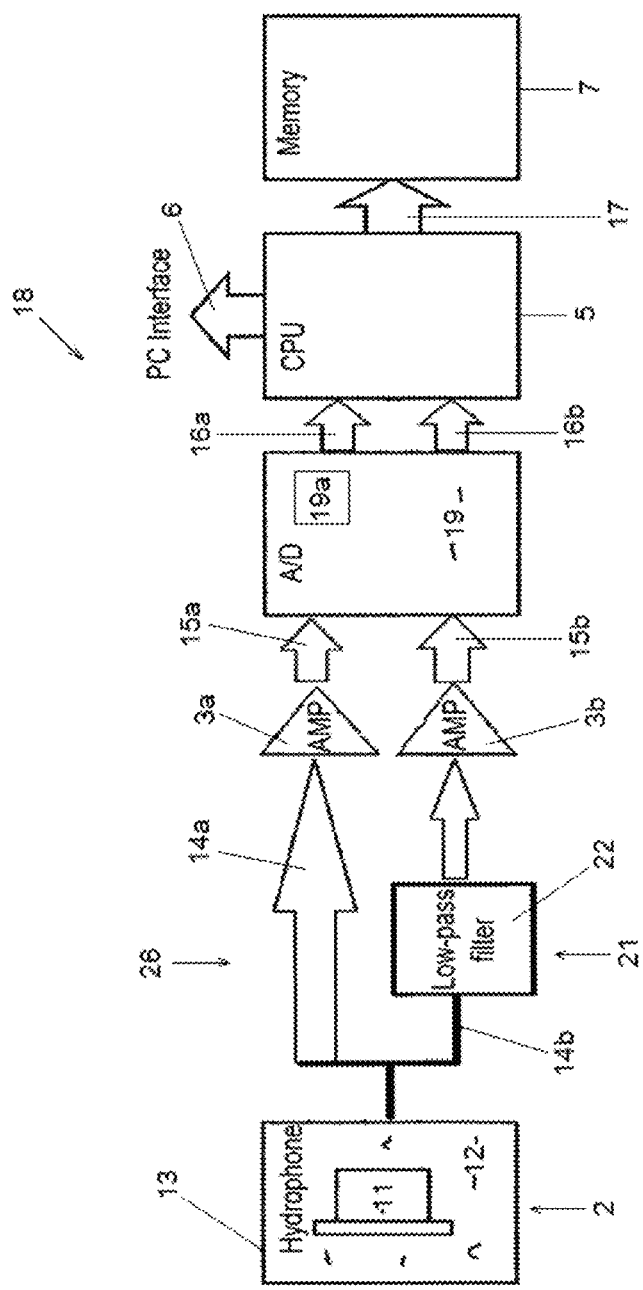

A further alternative embodiment of the SNL tool, as depicted generally 1 by reference numeral 18, will now be described with reference to FIG. 2(b). The presently described embodiment is similar to that described above with reference to FIG. 2(a) however the SNL tool 18 now incorporates a 12 bit, two-channel analogue to digital convertor 19 and a first 20 and a second frequency channel 21. The analogue to digital convertor 19 may again comprise its own cache memory 19a to assist in achieving high sampling frequencies.

The first frequency channel 20 comprises a first gain amplifier 3a and is configured to function in a similar manner to that described above in relation to the SNL tool 1 of FIG. 2(a) i.e. the gain stage 3a is employed to amplify a first component of the electrical output 14a from the hydrophone 2 by a factor of 100,000 and the output 15a of the gain stage 3a is then converted into a first digital signal 16a by the first channel of the analogue to digital convertor 19 which operates at a sampling frequency of 120 kHz.

The second frequency channel 21 comprises a low-pass filter 22 which is configured to remove frequencies higher than 4 kHz from the electrical output 14b from the hydrophone 2 and a second gain stage 3b that is employed to amplify the electrical output 14b from the hydrophone 2 by a factor of 10,000. As can be seen from FIG. 2(b) the output 15b of the gain stage 3b is then converted into a digital signal 16b by a second channel of the analogue to digital convertor 19 which is achieved by sampling 1024 measurement samples at a sampling frequency of 8 kHz Signal processing of the digital signals 16a and 16b is again performed within the CPU 5 which may again provide a Fast Fourier Transform (FFT) to the digital signals 16a and 16b so as to convert the signals 16a and 16b to obtain the power-frequency spectrum data signal 17 from the acoustic noise detected by the hydrophone 2. The power-frequency spectrum data signal 17 is again saved as 1024 discrete frequency channels within the non-volatile, 2 GB capacity, internal memory 7. Alternatively, the signal processing requirements on the CPU 5 are reduced by saving the power-frequency spectrum data signal 17 as 1024 discrete time channels within the non-volatile internal memory 7 and performing the FFT signal processing of this data at the surface following retrieval at the SNL tool 18.

In a similar manner to that described above, the first channel 20 of SNL tool 1 18 effectively takes an 8.53 ms sample length every second. Therefore the first channel 20 allows the internal memory 7 to effectively store data for generating a power-frequency spectrum for every second of operation of the SNL tool 18 in the frequency range from 117 Hz to 60 kHz. By contrast, the second channel 21 of SNL tool 18 effectively takes a 128 ms sample length every second. Therefore the second channel allows the internal memory 7 to effectively store data for generating a power-frequency spectrum for every second of operation of the SNL tool 18 in the frequency range from 8 Hz to 4 kHz. It is found that more accurate results are achieved in this frequency range by operating a second channel at this lower sampling rate.

Once the tool 18 is retrieved from a borehole through which acoustic noise sampling has been performed the entire power-frequency spectrum data can again be downloaded, as appropriate, via the computer interface 6 of the CPU 5 for further analysis purposes.

Spectral Noise Logging Operation

Figure 3:
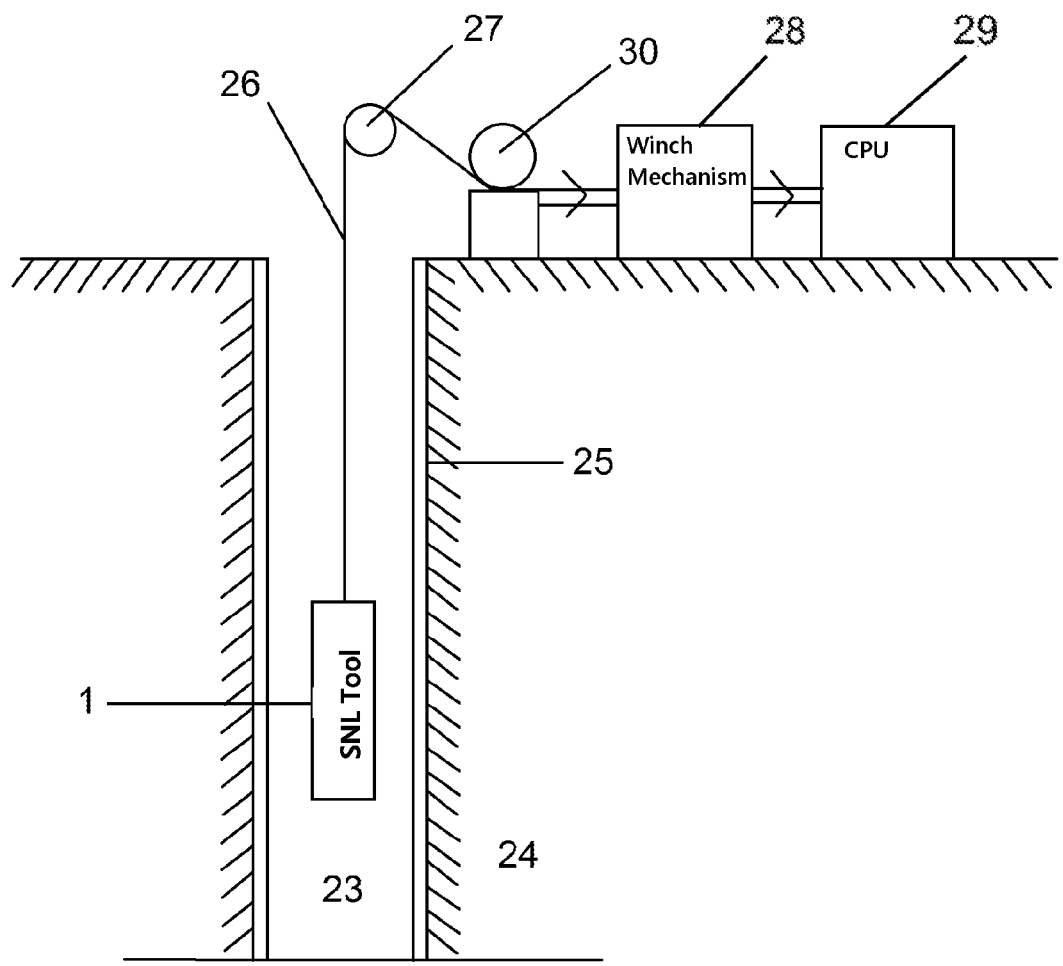
FIG. 3 presents a schematic representation of the deployment of a spectral noise logging tool in accordance with an embodiment of the present invention.

An explanation of the general principles of a spectral noise logging operation in a well employing the SNL tool 1 or 18 will now be described with reference to FIG. 3. As can be seen the SNL tool 1 or 18 is located in a borehole 23 that penetrates an earth formation 24. The borehole 23 is lined by a casing 25. The position of the SNL tool 1 or 18 within the borehole 23 is controlled by a cable 26 that is located over a sheave wheel 27 and which is attached at opposite ends to the connector 9 and a winch mechanism 28. The depth of the SNL tool 1 or 18 is recorded on a surface CPU 29 via a depth gauge 30 which is employed to measure the displacement of the cable 26.

When deployed, the SNL tool 1 or 18 is lowered into the borehole 23 by the winch mechanism 28 and acoustic noise data is acquired at stationary locations at one meter intervals along the length of the borehole 23. The SNL tool 1 or 18 is arranged to remain stationary at each of these locations for sixty second periods such that the tool 1 or 18 effectively records power-frequency spectrum data for sixty spectrums with 1024 channels in the frequency range of 117 Hz to 60 kHz or 8 Hz to 60 kHz at each location. After each survey the SNL tool 1 is retrieved and the time coded data can be downloaded for further analysis.

In practice two surveys are often performed for a borehole 23: one shut-1 in survey and one flowing survey.

It will be appreciated by those skilled in the art that although the above deployment methods are described by lowering the SNL tool 1 or 18 down through the borehole 23, the method may be adapted such that the SNL tool 1 or 18 starts at the distal end of the borehole 23 and is moved by the cable 26 and winch mechanism 28 back towards winch mechanism 28. Similarly the SNL tool 1 or 18 is not limited to use with boreholes 23 having a particular orientation e.g. vertically orientated boreholes. What is important is that a number of stationary data acquisition locations are obtained along the length of the borehole 23 in order that the appropriate power-frequency spectrum data can be recorded.

Surface Data Processing

The SNL tools 1 or 18 described above has been configured to provide highly accurate acoustic noise readings. Therefore, it is important for the interpretation process described in further detail below that it is only the power-frequency spectrum data from the stationary acquisition locations that are employed. This is because even the smallest of noises e.g. noise associated with the operation of the cable 26 and winch mechanism 28 or the movement of the SNL tool 1 or 18 itself within the borehole 23 result in large noise levels within a wide acoustic spectrum which then acts to mask the low noise signals associated with typical reservoir flow noise.

The first stage of the surface data processing techniques is therefore to identify those power-frequency spectrum data sets which were acquired at the stationary acquisition locations. This is achieved by:

identifying the position of the stationary recording locations on the depth curve i.e. those parts of a depth versus time curve where the velocity of the SNL tool can be seen to be below a threshold value;

identifying the position of the stationary recording locations on the acoustic noise data i.e. those parts of the acoustic noise versus time curve where the amplitude of the acoustic noise detected by the SNL tool can be seen to be below a threshold value;

correlating the information regarding the position of the stationary 1 recording locations identified from the depth curve and the acoustic noise data so as to minimise any differences between them.

Following the above process allows the sixty power-frequency spectrum data recorded at each stationary recording location to be identified. The surface CPU 29 is then employed to perform data processing of the power-frequency spectrum data by performing numerical averaging techniques across the data sets so as to provide a reliable power-frequency spectrum indicative of that depth. The numerical averaging techniques comprise wavelet filtering so as to provide a means for verifying the statistical significance of the details in a power-frequency spectrum data in particular, the spectral noise density seen in the depth-frequency plane is subject to wavelet conversion. Dozens of serial counts of noise signals for each depth enable the determination of average values of wavelet factors and their typical spread. Further analysis can therefore delete statistically minor details in the signal spectrum and clearly distinguish background components that are evident in a wide depth range (e.g. noise generated by the well bore flow or by the operation of a pump).

In the absence of wavelet filtering the numerical averaging techniques would be unable to separate the occasional spikes from the significant noises of the fluid in the well bore from those produced from sources of genuine interest, see the discussion below regarding the Spectral Noise Logging (SNL) panels.

It will be appreciated by those skilled in the art that other numerical averaging and tittering methods may be employed to process the power-frequency spectrum data. These include for example entropy averaging, order statistics and median filtering techniques.

The selected power-frequency spectrum data set for each stationary recording location can then be stacked and presented graphically, as discussed in further detail below, so as to provide spectral noise logging panels which can then be interpreted so as to provide the desired information regarding fluid flowing through, or behind, the casing of a well penetrating subsurface formation.

When employing the SNL tool 18, as presented in FIG. 2(*b*), it is found that the second channel 21 provides for more accurate, and hence more reliable, results for acoustic noise in the range 8 Hz to 4 kHz when compared to those results obtain using the single channel SNL tool 1 of FIG. 2(*a*).

Spectral Noise Logging (SNL) Panels

A number of spectral noise logging (SNL) panels obtained by employing the above described SNL tool 1 and associated method of deployment will now be described with reference to FIGS. 4 to 13.

Figure 4:
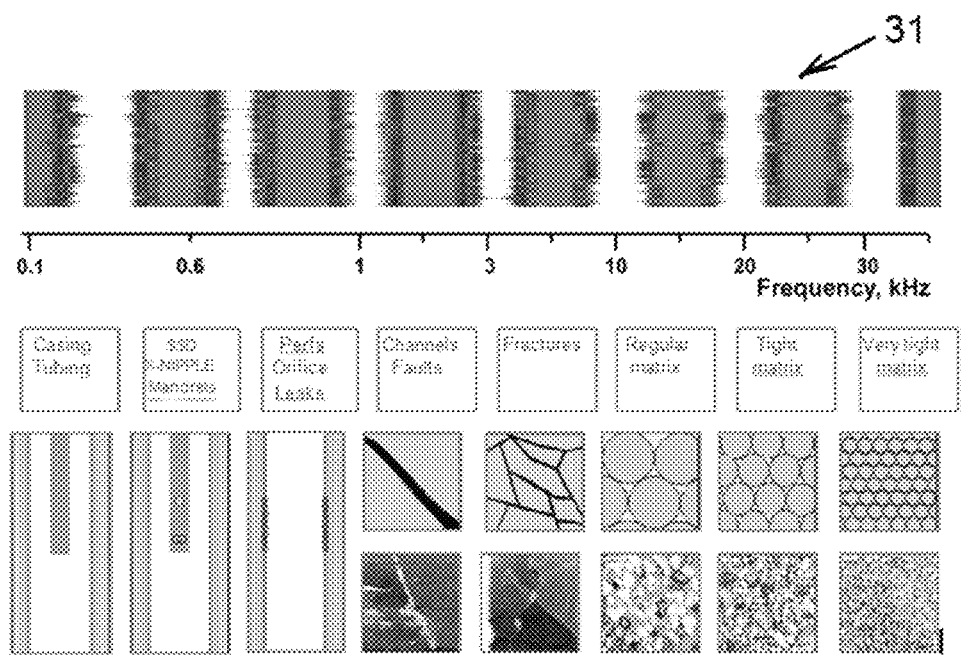
FIG. 4 presents a summary plot of the subsurface noise sources that can be detected by spectral noise logging tool of FIG. 1.

FIG. 4 presents a summary SNL panel 31 of subsurface noise sources that can be detected by the SNL tool 1 of FIG. 1. The left hand side of the SNL panel 31 shows frequencies in the region of 300 Hz (corresponding to casing tube elements) while the right hand side of the panel 31 shows frequencies up to 30 kHz (corresponding to noise from matrix flow behind the casing). The noise volumes are represented by means of a rainbow colour palette; with red colour standing for high volumes, blue colour standing for low volumes and white colour standing for no noise (or noise below the detection for threshold of the SNL tool 1).

The downhole noise sources can therefore be split into various categories which will now be discussed in turn:

Borehole Vertical Fluid Flow

This type of acoustic noise is produced by tubing and or casing 10 vibration induced by the borehole fluid flow. It normally occupies a frequency range below 1 kHz.

It has been noted that a turbulent borehole flow also produces noise in this low frequency range. As a result, if a borehole fluid pressure goes below its bubble point, then saturated gas is released that produces acoustic noise with around a 5 kHz pitch. The pitch of this acoustic noise component however tends towards 1 Hz as the saturated gas is lifted towards the surface.

Given that the borehole noise is produced within the borehole 23 it has no vertical localisation such that the associated acoustic noise spectrum has no clear infrastructure.

It is further noted that given the frequency ranges involved, borehole acoustic noise is normally audible to the human ear.

Completion Elements

Acoustic noise from completion elements is produced by perforations. X-Nipples, detectors, tubing shoes, gas mandrels, packers and casing leaks. These elements normally product acoustic noise in a frequency range between 1 kHz and 3 kHz.

Completion noise is however localised in space within the borehole 23, and therefore can be located vertically as standalone high volume spots on an SNL panel. In practice, they are not clearly localised in flowing conditions because of the masking effects of borehole noise residing in the adjacent frequency bandwidth. On the other hand, the same elements can clearly be distinguished on shut-in SNL panels when the after-flow is strong at the moment of survey. It is found that on occasion the completion elements sometimes produce an unusually high pitch noise e.g. in the case of a poor perforation or a packer casing leakage. The associated frequency spectrum however normally stands out from the normal completion element bandwidth, and therefore are very noticeable on an SNL panel.

Channelling Behind the Casing

As is known in the art, channelling is a flow which occurs behind the casing as a result of fractured cement or a fractured reservoir. It has clear boundaries (top and bottom in a vertical borehole 23), and therefore appears on the SNL panel as a narrow stand-alone vertical strip connecting two active streaks. The channel noise is found to vary in pitch (and may deviate from a vertical line), as the channel hole may vary in size and structure. Furthermore, the channel may periodically be interrupted when passing through larger holes (for example, when encountering areas of absent cement) which act to shift the pitch to a lower frequency where it may be masked by general borehole noise.

Reservoir Flow

Reservoir flow noise is produced by grains, pore throats and fracture vibrations of the reservoir fluid flow. It has clear vertical boundaries (top and bottom in a vertical borehole 23) but exhibits no radial localisation. The acoustic noise associated with reservoir fractures normally falls into the frequency range between 3 kHz and 5 kHz, but larger fractures and caverns may produce acoustic noise as low as 1 kHz. In this range the acoustic noise from the reservoir flow may interfere with the noise 1 produced by the completion elements. It is also found that same reservoir noise spectrums show two neighbouring bands of fractures associate with fracture networks of different scales.

A regular matrix flow is found to produce a noise around 10 kHz to 15 kHz, but may occupy a wider frequency range. For example, tight formations are known to produce an acoustic noise in the ultrasound range (greater than 20 kHz). In the case of the exceptionally tight formations i.e. ones with less than 1 mD permeability, only gas can percolate through these rocks and thus produce an acoustic noise in a wide range of frequencies, including those greater than 30 kHz.

Unlike borehole flow noise, reservoir flow noise is mostly inaudible to the human ear because of its low volume and high pitch.

Extending the audible frequency range up to 60 kHz allows the SNL tool 1 to detect acoustic noise generated within porous media, and therefore the SNL tool 1 is not limited to detecting casing leaks, as is the case for many apparatus and methods described in the prior art.

Figure 5:
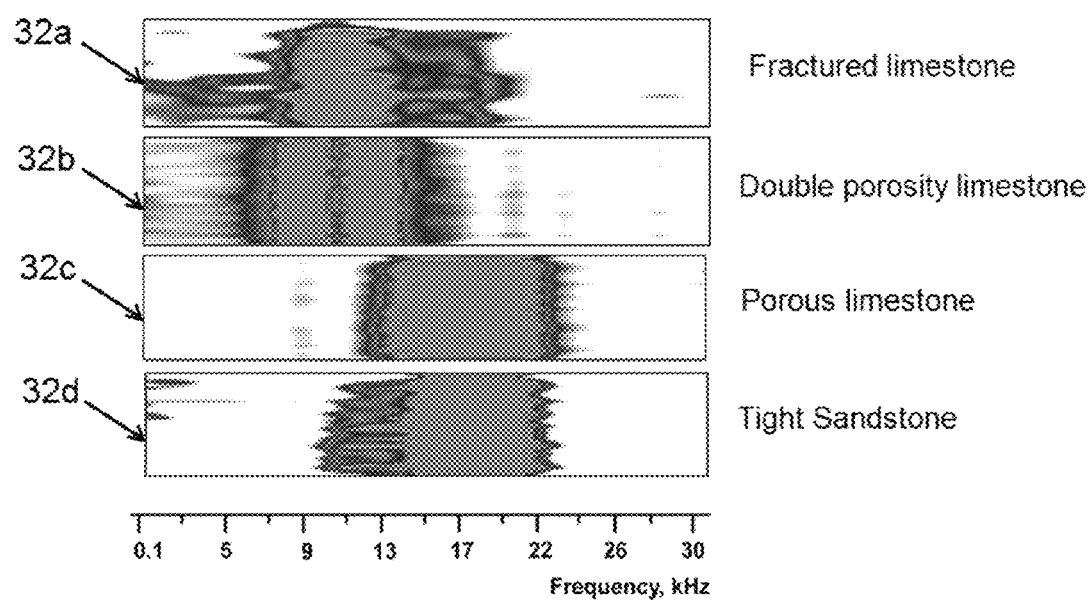
FIG. 5 presents plots of noise structures associated with different rock types that can be detected by the spectral noise logging tool of FIG. 1.

The effects of different rock types on the SNL panels will now be described with reference to FIG. 5. In particular, FIG. 5 shows SNL panels produced for four different rock types, namely fractured limestone 32*a*, double porosity limestone 32*b*, porous limestone 32*c* and a tight sandstone 32*d*. It can therefore be readily seen that the SNL tool 1 can produce SNL panels which allows for the clear distinction of the composition of the surrounding earth formation.

Figure 6:
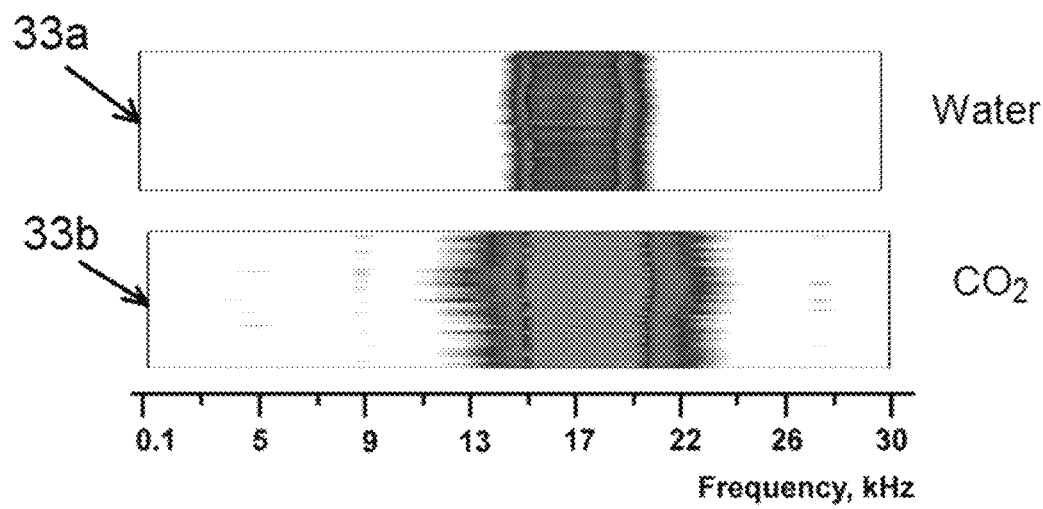
FIG. 6 presents plots of noise structures associated with different fluid types that can be detected by the spectral noise logging tool of FIG. 1.
Figure 7:
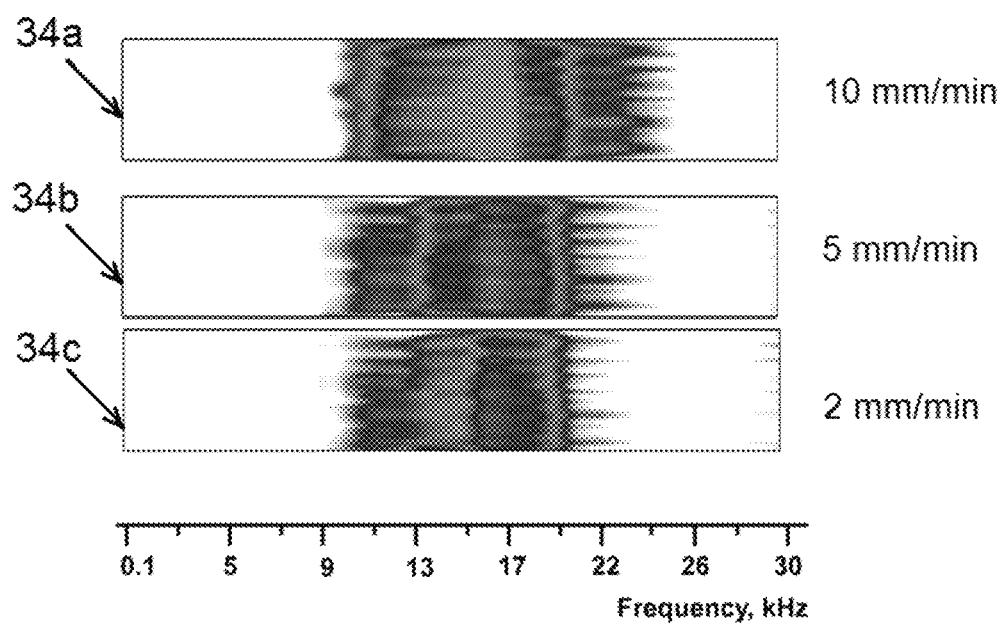
FIG. 7 presents plots of noise structures associated with different fluid flow rates that can be detected by the spectral noise logging tool of FIG. 1.

FIG. 6 presents SNL panels associated with different fluid types. It is found that liquid type in itself does not seriously affect the spectrum of the SNL panel. Generally the liquid is either oil or water. However, if the rocks are highly fissured, then a gas may also be present. From the SNL panels 33*a* and 33*b* of FIG. 6, it can be seen that there is a clear difference between the SNL panels produced by a liquid 33*a*, than those produced by a gas 33*b*, in this particular example, water and carbon dioxide, respectively. In general, when a gas penetrates a fissure it produces a noise that exhibits a wider frequency range than that associated with a liquid, and in general is also much noisier than a liquid flow.

It is also found that in certain circumstances the SNL panels can provide 1 a means for distinguishing between different fluid flow rates within the borehole. In general it is found that that the volume at an acoustic noise grows linearly with increasing flow rate. An example of SNL panels for three flow rates, namely 10 mm/min 34*a*, 5 mm/min 34*b* and 2 mm/min 34*c* are presented in FIG. 7 for comparison purposes. These results can provide a means far determining the presence of an injector or a single phase producer.

FIGS. 8 to 13 present example SNL panels obtained following the deployment of the SNL tool 1 of FIG. 2(*a*) with a variety of boreholes 23. For comparison purposes, QZW panels 35 and QZIW panels 36 produced from spinner flow meters within the same boreholes 23 have also been provided within FIGS. 8 to 11. Also included in these particular figures are volumetric rock models 37 of the associated boreholes 23.

Figure 8:
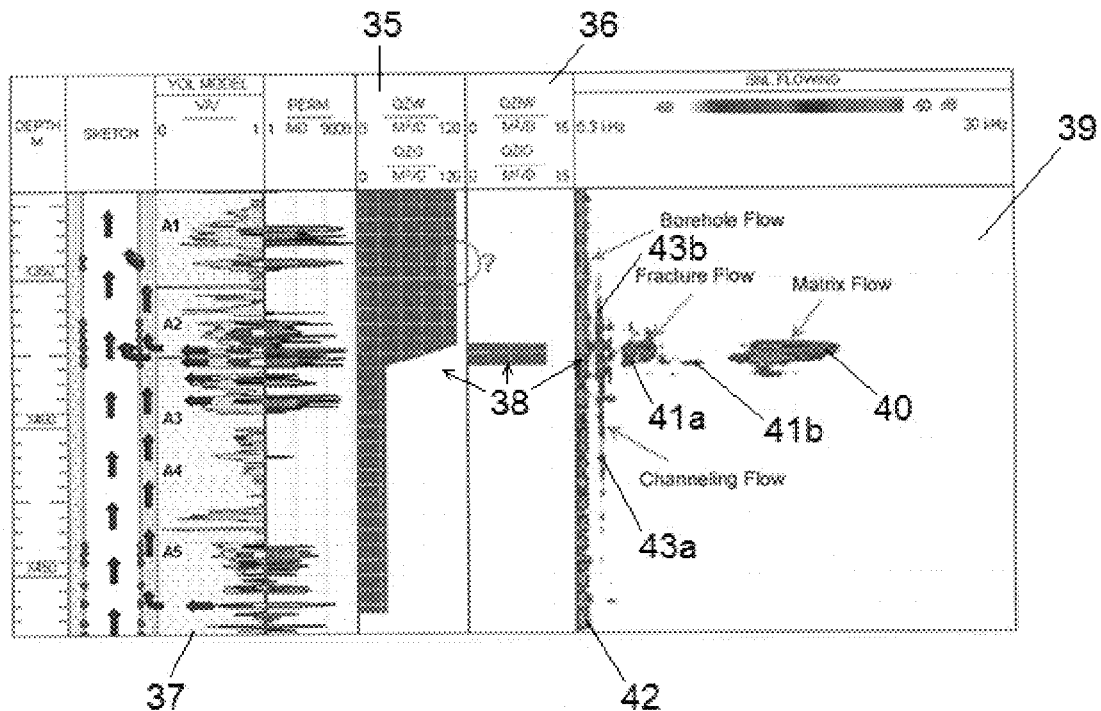
FIG. 8 presents an example power-frequency spectra produced from the data recorded by the spectral noise loading tool of FIG. 2(a) within a producer borehole.

In FIG. 8, production 38 can clearly be seen from a reservoir within region A2 on both the spinner panels 35 and 36 and the SNL panel 39. Considerable further detail can however be extracted from the SNL panel 39 as compared to the that provided on spinner panels 35 and 36. In particular, the SNL panel 39 distinctly shows matrix flow 40 as an acoustic noise peak around 15 kHz, which is also paired with two peaks 41*a* and 41*b* around 3 kHz and 5 kHz, which originate from a fracture flow, and which most probably are in fluid communication across the fracture components. It can also be seen from FIG. 8 that the streaks in the SNL panel are well matched to the porosity/permeability streaks found within the volumetric rock model 37.

The SNL panel 39 also shows a continuous low frequency acoustic noise component 42 below the perforations, which is in correspondence with the spinner panels 35 and 36 showing a fluid lift from the bottom of the survey. However, the SNL panel 39 also shows a 2 kHz vertical satellite band 43*a* that is clearly separated from the borehole noise 42, and which has no corresponding feature within the spinner panels 35 and 36. This feature corresponds to channelling which starts along with an inflow at the bottom of region A5 and continues all the way up the main production to region A2.

The SNL panel 39 also shows a second channelling feature 43*b*, which continues on to the upper perforations in region A1, and which is again of such a small quantity that it is has an undistinguishable effect within the spinner panels 35 and 36.

Figure 9:
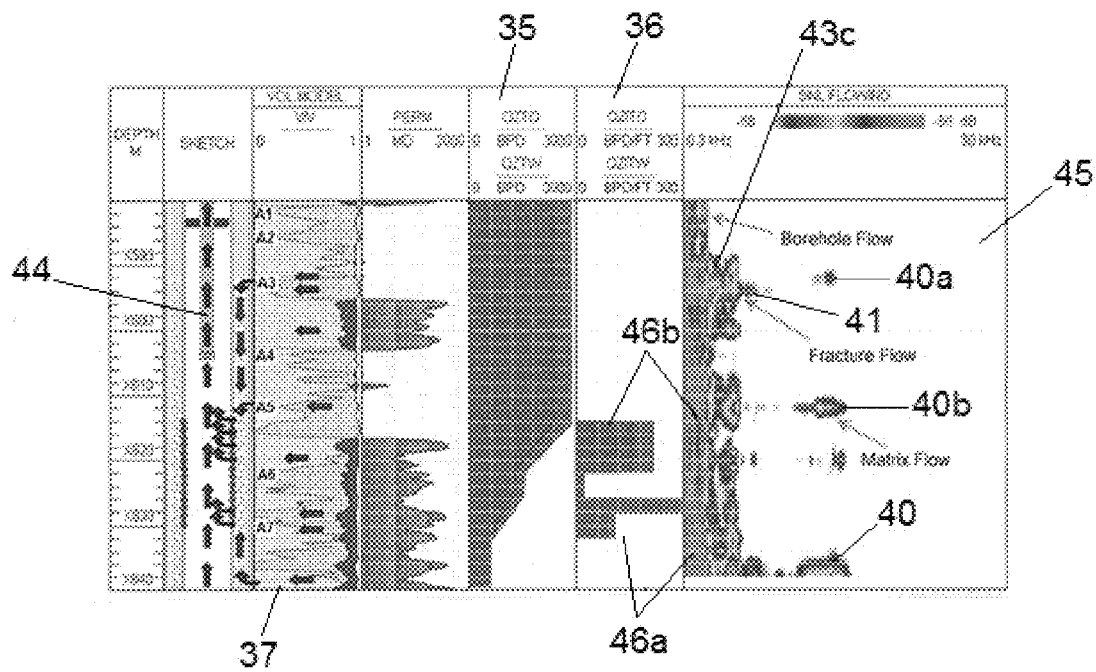
FIG. 9 presents an example power-frequency spectra produced from the data recorded by the spectral noise logging tool of FIG. 2(a) within an alternative producer borehole.

FIG. 9 presents an example of a more complicated scenario within a production flow wherein a tubing 44 is located in the borehole 23. In this example, both the spinner panels 35 and 36 and the SNL panel 45 show an inflow 46*a* from the bottom of the borehole 23, region A7. However, the SNL panel 45 suggests that the source of the lower inflow 46*a* is a reservoir very close to the lower end of the borehole 23 and, as such, a matrix flow structure 40 is present within the recorded acoustic noise. This detail is not apparent from either of the spinner panels 35 and 36.

The SNL panel 45 also shows a higher pitch spectral band 43*c*, which again clearly relates to behind the case channelling.

Interesting is the fact that the SNL panel 45 does not show any acoustic noise across region A7, even though a flow is clearly seen at this location on the spinner panels 35 and 36. This suggests that the inflow 46*a* is sourced from the same channelling at the bottom of the borehole 23, and indeed one can see that a channelling noise 43*c* is reduced exactly across the top of the region A7 inflow.

A second inflow 46*b* in region A6 is confirmed from both the spinner panels 35 and 36 and the SNL panel 45, suggesting this is a regular radial inflow. Starting from this point and continuing all the way up, there are no signs of further borehole flow changes from the spinner panels 35 and 36. However, the SNL panel 45 clearly shows two flowing units in regions A3, namely a matrix flow 40*a* and a fracture flow 41, and a third flowing unit in region A5, namely a matrix flow 40*b*. These three flowing units 40*a*, 41 and 40*b* act to run fluid flow behind the casing 25 and into the perforations in region A6.

A point to note is that in SNL panel 45, the matrix flow streaks 40*a* and 40*b* were obtained while the SNL tool 1 was located inside the tubing 44, i.e. within a noisy flow condition and through multiple layers, namely the tubing 44, annulus, casing 25 and cement layers.

Figure 10:
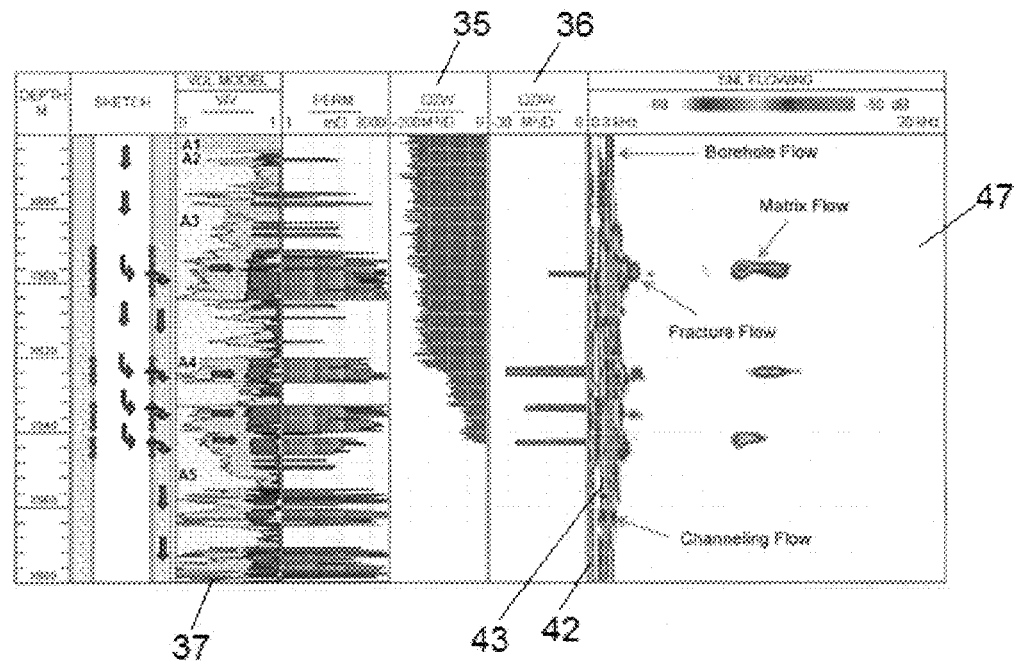
FIG. 10 presents an example power-frequency spectra produced from the data recorded by the spectral noise logging tool of FIG. 2(a) within an injector borehole.

FIG. 10 presents a first example of an SNL panel 47 obtained during an injection process. In particular, FIG. 10 shows a regular injection into four perforated zones. The SNL panel 47 clearly shows a continuation 43 of the low frequency noise below the perforations, where the spinner panels 35 and 36 suggests no flow exists. This continuation 43 can be seen as the distinctive red colour band in the higher than borehole acoustic noise range 42, which as previously described is indicative 1 of the presence of channelling behind the casing 25.

The SNL panel 47 also shows that in the middle of region A4, there is no matrix flow noise component, which means that the injected water is sweeping through the fractures and does not penetrate the reservoir matrix.

Figure 11:
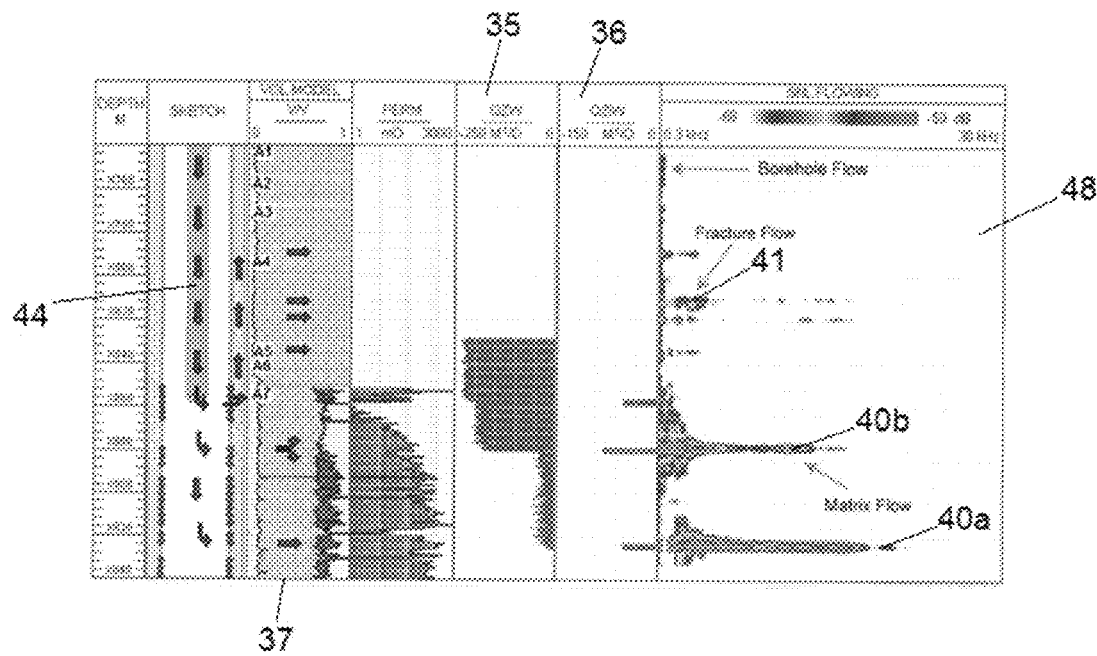
FIG. 11 presents an example power-frequency spectra produced from the data recorded by the spectral noise logging tool of FIG. 2(a) within an alternative injector borehole.

By comparison, FIG. 11 presents an SNL panel 48 for a regular injection through a tubing 44. The spinner panels 35 and 36 shows that a small part of the injected water has gone once the SNL tool 1 is out of the tubing 44 as a result of the tubing overhanging the top of the perforations. However, the SNL panel 48 does not show any reservoir noise across the tubing shoe, which means that the injected water is flowing via an alternative path. An analysis of the through tubing SNL panel 48 readings above the pay zone clearly shows three streaks of reservoir noise 40*a*, 40*b* and 41 (the upper streak showing fracture noise only), which accounts for the missing injected water within region A7.

The SNL panel 48 also confirms two lower streaks 40*a* and 40*b*, but suggests a fracture extension of the fluid flow in both cases.

It should be noted that the SNL panel 48 was obtained when the SNL tool 1 was located within the tubing 44 and was streamlined by massive through tubing injection. Even in these circumstances, the SNL tool 1 was able to capture very low reservoir noise through the annulus, casing 10 and behind the casing channelling 43.

Figure 12:
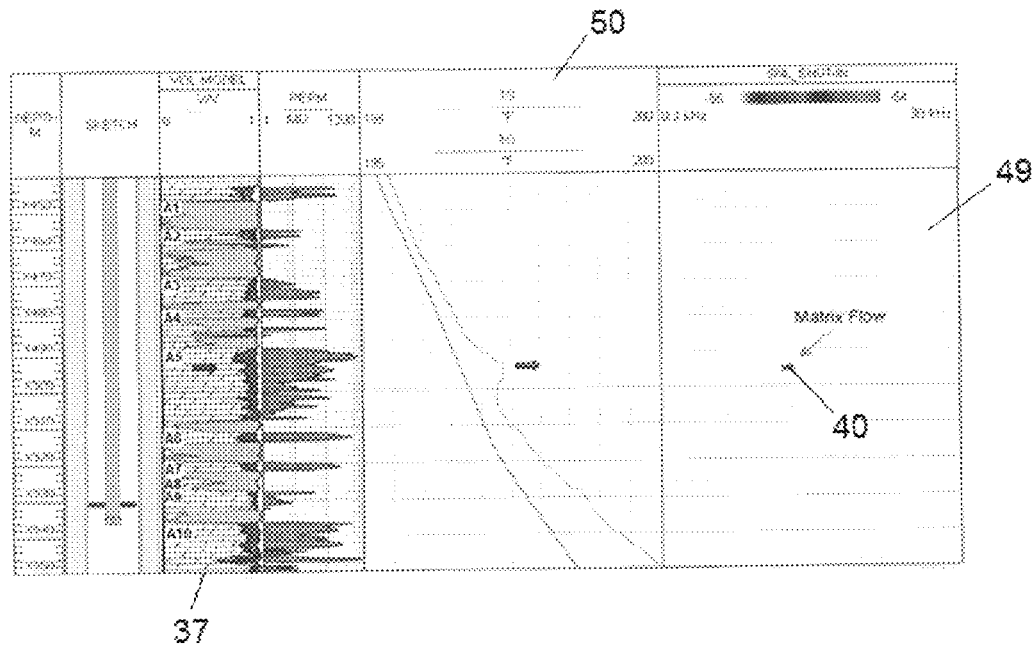
FIG. 12 presents an example power-frequency spectra produced from the data recorded by the spectral noise logging tool of FIG. 2(a) within an observer borehole.

FIG. 12 presents an SNL panel 49 that highlights a regional reservoir lateral flow noise in an observer. Instead of spinner panels 35 and 36 being incorporated for comparison purposes, in this panel they have been replaced by a high temperature resolution temperature log 50. The matrix flow 40 can clearly be seen in both the SNL panel 49 and the high resolution temperature log panel 50.

This example shows how SNL logging can be employed to assist in monitoring the regional vertical flow profile within a borehole 23. While temperature and pulsed neutron logging are effective in capturing water/gas invasion zones, they are not able to identify which units are currently active or inactive. The above example shows how complementary spectral noise logging can be of assistance in resolving this matter.

Figure 13:
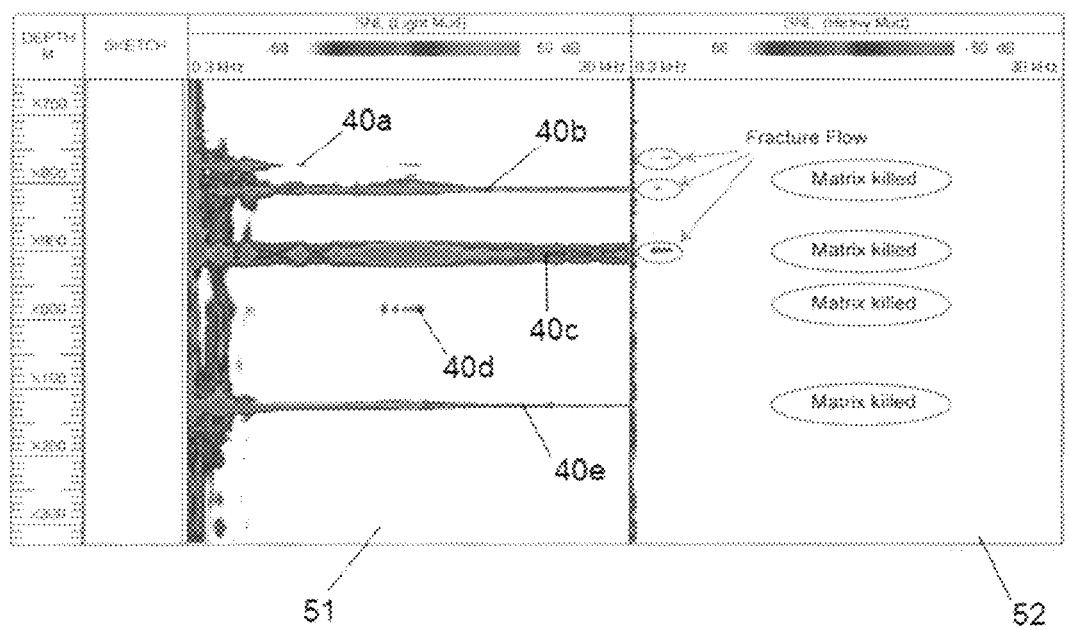
FIG. 13 presents an example power-frequency spectra produced from the data recorded by the spectral noise logging tool of FIG. 2(a) within a drilling well.

A final example of the functionality of the SNL tool 1 is provided with reference to FIG. 13. FIG. 13 presents two SNL panels 51 and 52 token in a newly drilled well before casing 25 has been run. In the first panel 51, active reservoir flow units 40*a*, 40*b*, 40*c*, 40*d* and 40*e* can clearly be seen along with the fluid communication between them. The second panel 52 shows the case where borehole mud was replaced by a heavier mud, in order to kill the active matrix flow units 40a, 40b, 40c, 40d and 40e. It can clearly be seen that the lower two active matrix flow units 40d and 40e have been completely killed by the presence of the heavier mud, while the upper three flow units 40a, 40b, 40c were suspended in matrix, although there was still a fluid flow present through fractures 41a, 41b and 41c.

Figure 14:
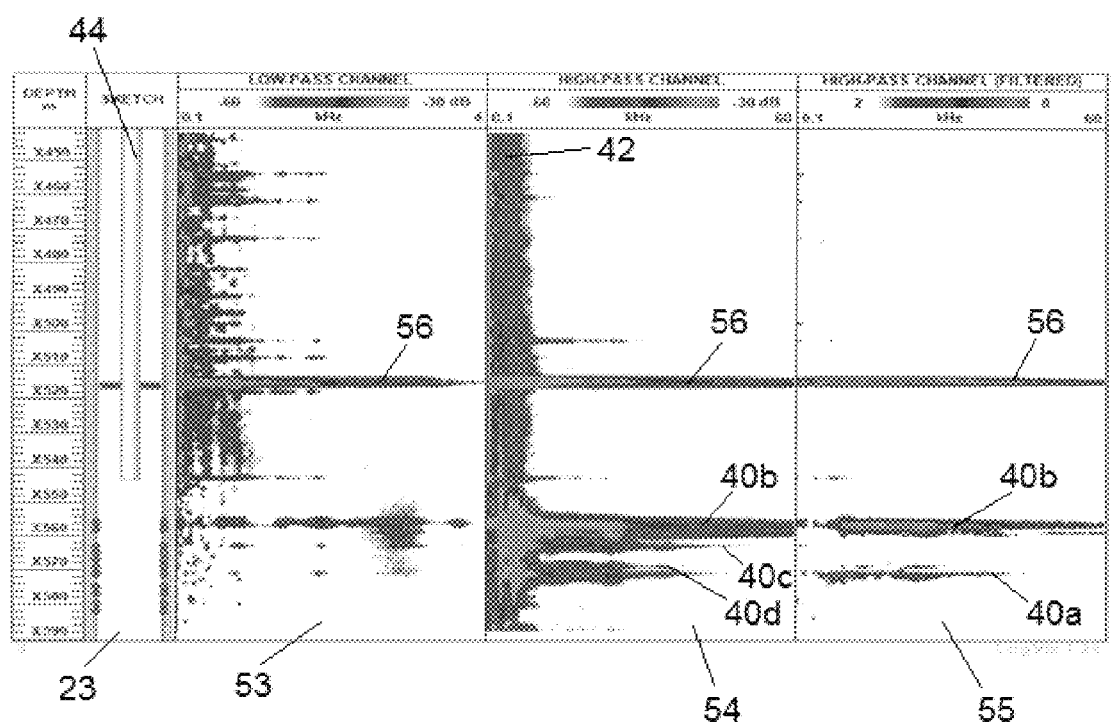
FIG. 14 presents an example power-frequency spectra produced from the data recorded by the spectral noise logging tool of FIG. 2(b) within a drilling well.

By way of comparison, FIG. 14 presents three SNL panels 53, 54 and 55 produced from data recorded by deployment of SNL tool 18 within a production flow wherein a tubing 44 is again located in the borehole 23. In particular the panel 53 is generated as described above from the data obtained on the second frequency channel 21 of the SNL tool 18 while panel 54 is generated from data obtained on the first frequency channel 20. In a similar manner panel 55 is generated from data obtained on the first frequency channel 20 but on this occasion that data has been subject to a wavelet numerical filtering process. This allows for the removal of the low-frequency noise induced by the borehole flow 42. A statistically significant noise 40a caused by reservoir flow was identified opposite the perforations.

In panels 54 and 55 a 0.1 kHz to 60 kHz band of noise 40b in the interval X555-X560.8m can be clearly seen. This high-frequency noise denotes reservoir flow. The high noise intensity observed in this interval indicates that a large injected fluid flowing extensively into the upper perforated interval.

These panels 54 and 55 also exhibit 0.1-30 kHz band of noise in the intervals _562-_564 40c, _568.6-_569.4 40d and _570.4-572.4 m 40a. These high-frequency noises again denote reservoir flow but the weak noise density indicates that these intervals have much less fluid coming in than the that previously described.

The low-frequency noise of the panels 54 and 55 also demonstrate 1 the presence of noise from borehole flow 42. The long streak opposite 56 the depth of X515 m in the spectral profile relates to a tubing size change.

Referring now to the low-pass panel 53 it can be seen that opposite the perforated interval the noise is too weak to be captured. This supports that fact that the best part of noise signal energy induced by matrix flow is accumulated in the high-frequency domain.

The above described apparatus and methods provide a number of significant advantages when compared to those systems known in the art. In the first instance the described tools permit the use of much higher sampling rates than those tools described in the art e.g. a sampling rate of 120 kHz can be employed. This allows the tools to exhibit a significantly increased sensitivity and which operate over a greater frequency range than those tools known in the art i.e. 117 Hz to 60 kHz. The operating range can be further increased by the incorporation of a second channel within the tool. In particular improved results a low frequencies (6 Hz to 4 KHz) have been obtained by incorporating a second channel within the tool dedicated to measuring and recording in this acoustic frequency range.

This increased sensitivity means that readings can be obtained for various fluid types through multiple barriers within the borehole e.g. through tubing and casing and which penetrate several meters into the surrounding formations, even in the presence of significant borehole flow. The SNL tool can however also be run as part of a shut-in survey. As a result, the described SNL tool can not only detect and characterise leaks through the casing but can also detect and characterise fluid flow from behind the casing e.g. channelling or acoustic noise associated with surrounding fractures or matrix formations.

The described apparatus and methods of deployment are non directional i.e. not limited to use with a vertical borehole. They can also be employed to assist in characterising rock types within the surrounding formations, type of fluids flowing within these formations and the flow rates associated with these fluids Another significant example of the described SNL tool resides in the fact that that it is designed to operate in memory mode. As a result the readings taken at the various stationary recording locations are completely insensitive to the quality of 1 a slick-line unit and to the mode of conveyance of the tool through the borehole.

The SNL tool is also highly adaptable and so can be run as a Component part of a longer drill string. The drill string for example could comprise other complimentary logging apparatus.

It is anticipated that the SNL tool will find application within a range of drilling, production logging, regional flow monitoring, petrophysics processes and within the development of three dimensional fluid flow simulations. These include, but are not limited to the:

well integrity an analysis, identifying active zone of permeable formation in infection and production wells, in openhole and through a casing, identifying behind the casing flow in injection and production wells, identifying type of rock matrix, monitoring vertical profile of regional subsurface flows through observes, including ecological zone, identifying which fractures are active and which are non-active Methods and apparatus for performing spectral noise logging (SNL) within a borehole are described. In particular an SNL tool is described that comprises an acoustic detector, a gain stage, an analogue to digital convertor a CPU and an internal memory. The described methodology and apparatus exhibits significantly increased sensitivity and allow for operation over a frequency range of 8 Hz to 60 kHz. As a result, the SNL tool can not only be employed to detect and characterise leaks through a casing but it can also detect and characterise fluid flow from behind the casing e.g. channelling or acoustic noise associated with surrounding fractures or matrix formations.

The foregoing description of the invention has been presented for purposes of illustration and description and is not intended to be exhaustive or to limit the invention to the precise form disclosed. The described embodiments were chosen and described in order to best explain the principles of the invention and its practical application to hereby enable others skilled in the art to best utilise the invention in various embodiments and with various modifications as are suited to the particular use contemplated. Therefore, further modifications or improvements may be incorporated without departing 1 from the scope of the invention as defined by the appended claims.

The invention claimed is:

1. A spectral noise logging (SNL) tool, said tool comprising:
    an acoustic detector configured to generate an electrical output signal;
    a first frequency channel comprising a first gain stage arranged to receive and amplify the electrical output signal to produce a first channel output in a first frequency range;
    a second frequency channel comprising a filter and a second gain stage arranged to receive, filter and amplify the electrical output signal to produce a second channel output in a second frequency range, wherein the first and second frequency channels are separate electrical paths producing separate channel outputs, and wherein the second frequency range is a subset of the first frequency range;

an analogue to digital convertor configured to digitize the first and second channel outputs to produce first and second digitized outputs, respectively;

a computer processing unit (CPU) configured to process the first and second digitized outputs from said analogue to digital convertor to generate a power frequency spectrum data set, wherein the power frequency spectrum data set comprises a frequency component from the first frequency channel in the first frequency range and a low frequency component from the second frequency channel in the second frequency range; and an internal memory configured to store said power frequency spectrum data set.

2. The tool of claim 1, wherein said acoustic detector is configured to detect acoustic noise in a range from 8 Hz to 60 kHz.

3. The tool of claim 1, wherein said acoustic detector comprises a pressure pulse sensor or a hydrophone.

4. The tool of claim 3, wherein said hydrophone comprises a piezo electric material mounted within a chamber.

5. The tool of claim 4, wherein said piezo electric material comprises a piezoceramic.

6. The tool of claim 4, wherein said chamber is oil filled.

7. The tool of claim 1, wherein said analogue to digital convertor is configured to sample said first frequency channel at a first sampling rate and said second frequency channel at a second sampling rate.

8. The tool of claim 7, wherein said first sampling rate is at least 120 kHz.

9. The tool of claim 1, wherein said filter is a low-pass frequency filter.

10. The tool of claim 9, wherein said low-pass frequency filter is configured to remove frequencies higher than 4 kHz.

11. The tool of claim 7, wherein said second sampling rate is at least 8 kHz.

12. The tool of claim 1, wherein said power-frequency spectrum data set comprises digitized time data.

13. The tool of claim 1, wherein the CPU processes the first and second digitized outputs using a Fast Fourier Transform (FFT) to produce first and second power frequency spectrum data sets, respectively.

14. The tool of claim 13, wherein the power frequency spectrum data set is a single power frequency spectrum data set, and wherein the CPU processes the first and second power frequency spectrum data sets by performing numerical averaging to produce the single power frequency spectrum data set.

15. The tool of claim 1, wherein the CPU processes the frequency component from the first frequency channel in the first frequency range by performing wavelet numerical filtering to remove low-frequency noise.

* * * * *